United States Patent

Laura et al.

[15] 3,689,894

[45] Sept. 5, 1972

[54] IMAGE STORAGE AND RETRIEVAL SYSTEM

[72] Inventors: James F. Laura, Chelmsford; Albert Eng, Chestnut Hill, both of Mass.

[73] Assignee: Foto-Mem, Inc., Natick, Mass.

[22] Filed: April 6, 1970

[21] Appl. No.: 26,016

Related U.S. Application Data

[63] Continuation-in-part of Ser. No. 713,340, March 15, 1968.

[52] U.S. Cl. ....................340/172.5

[51] Int. Cl. ....................G06f 3/14

[58] Field of Search ............340/172.5; 346/17, 76 L; 353/25; 350/DIG. 1

[56] References Cited

UNITED STATES PATENTS

| | | | |
|---|---|---|---|
| 3,438,000 | 4/1969 | Irasek | 340/172.5 |
| 3,465,352 | 9/1969 | Carlson et al. | 346/76 |
| 3,523,183 | 8/1970 | Silverman | 340/172.5 X |
| 3,149,529 | 9/1964 | Critchlow | 88/24 |

*Primary Examiner*—Raulfe B. Zache
*Attorney*—Wolf, Greenfield & Sacks

[57] ABSTRACT

A total image storage and retrieval system has a copier, step and repeat camera for photographing documents on microfilm frames, and means for developing the microfilm and assembling the frames on microfiche cards that are encoded and stored in a large capacity storage bin having associated means for automatically retrieving the microfiche. One or more retrieval stations, each typically having a keyboard for selecting images sought to be retrieved and a display, such as a television tube, for displaying the selected retrieved images, includes means for signaling the data file bin to produce a specific image, scan the image thus retrieved, store the scanned retrieved image and transmit the stored scanned retrieved image to designated displays, typically the display tube associated with the interrogating keyboard, or to a printer that may provide a copy of the retreived image in permanent form, and/or to data processing machines to interpret the information or data for further transmission or processing with other pertinent information and/or data. A specific image may be produced by writing data on a film by an optical system, which may include a laser source. The data may be read by a second optical system, such as an optical fiber detector array.

2 Claims, 13 Drawing Figures

INVENTORS
ALBERT ENG
JAMES F. LAURA
BY
Wolf, Greenfield & Hieken
ATTORNEYS

INVENTORS
ALBERT ENG
JAMES F. LAURA
BY Wolf Greenfield & Hieken
ATTORNEY

INVENTORS
ALBERT ENG
JAMES F. LAURA
BY Wolf Greenfield & Hieken
ATTORNEYS

INVENTOR
ALBERT ENG
JAMES F. LAURA
BY Wolf, Greenfield & Hieken
ATTORNEYS

INVENTORS
JAMES F. LAURA
ALBERT ENG
BY
Wolf, Greenfield, Hieken & Sacks
ATTORNEYS

IMAGE STORAGE AND RETRIEVAL SYSTEM

REFERENCE TO PRIOR APPLICATION

This application is a continuation-in-part of application Ser. No. 713,340 filed Mar. 15, 1968.

BACKGROUND OF THE INVENTION

The present invention relates in general to information storage and retrieval and more particularly concerns a novel system capable of handling information in digital, analog, pictorial, graphic, textual, video, audio and other forms using magnetic and/or electroptical mechanical means of recording, writing, reading, transmitting, displaying and printing of information. A system according to the invention facilitates establishment of a central storage bin with an enormous amount of information that would be too costly and ordinarily require too much space to justify assembly by a single entity because the invention facilitates rapid access to any of the information by any of a widely scattered group of subscribers at virtually any time.

In numerous technical and nontechnical fields the supply of information has increased at an exceptionally rapid rate, severely taxing the physical facilities for storing, indexing and making available this information to interested people while making it difficult for an interested person to consider information of interest in a reasonable time.

The Patent Office assembly of patents is a good example. The physical space required to store all patents is so great that the Patent Office stores patents on microfilm. And the only place where patents are arranged according to subject matter is in Washington, D. C. A searcher must physically carry the shoes of patents in the subject matter of interest to a desk and physically move the patents. Moreover, if a patent has been removed from a particular shoe, the searcher would miss what perhaps could be the most pertinent subject matter. The Patent Office system thus highlights the problems created by the information explosion of inadequate physical facilities for storing the information, the danger of losing important information, slow access to the information and limited access to the information.

Accordingly, it is an important object of this invention to overcome one or more of the disadvantages enumerated above.

It is another important object of this invention to provide methods and means for storing an enormous amount of information in a relatively small storage volume while facilitating rapid access to the stored information by a large number of subscribers substantially simultaneously, subscribers that may be widely scattered.

It is another object of the invention to achieve one or more of the preceding objects while facilitating immediate display of documents.

It is a further object of the invention to provide rapid storage and retrieval of information with optical writing and reading techniques.

It is another object of the invention to achieve one or more of the preceding objects while providing for simultaneous writing and reading of information by optical techniques.

It is another object of the invention to achieve one or more of the preceding objects while utilizing a reliable, nondispersive optical writer, as for example, a laser source.

It is a further object of the invention to achieve one or more of the preceding objects while facilitating rapid permanent reproduction of selected documents.

It is a further object of the invention to achieve one or more of the preceding objects while minimizing the chances that pertinent data will be removed from the storage file and thus overlooked by the subscriber.

SUMMARY OF THE INVENTION

According to the invention, there is means for converting documents of interest into stored document signals with each stored document characterized by a document address in main document storage. Means, such as a keyboard, and/or computer processors, are provided for identifying a document address to recall that document and scan that document to provide a recovered document signal. Buffer storage means receives the recovered document signal and stores the recovered document signal and selectively releases the stored recovered document signal to display means, such as a television picture tube and/or a printer.

In a preferred embodiment of the invention data is recorded in columns, preferably optically, and may be recovered by scanning the columns in such a manner that ambiguities and errors are avoided.

An optical writing system employs an optical source, preferably a laser, for recording data selectively. Data may be recorded by informationally controlling the optical signal so that the recorded data represents the stored information. The recorded data may be read, likewise, by an optical reading system. The reading system may comprise a high intensity light source in conjunction with proper focusing optics. The image of the focused light may be selectively sensed by optical detectors. The optical detectors may be arranged in an array to sense the recorded columns of data.

Other features, objects and advantages of the invention will become apparent from the following specification when read in connection with the accompanying drawing in which:

DETAILED DESCRIPTION OF PREFERRED EMBODIMENTS

Figure 1:
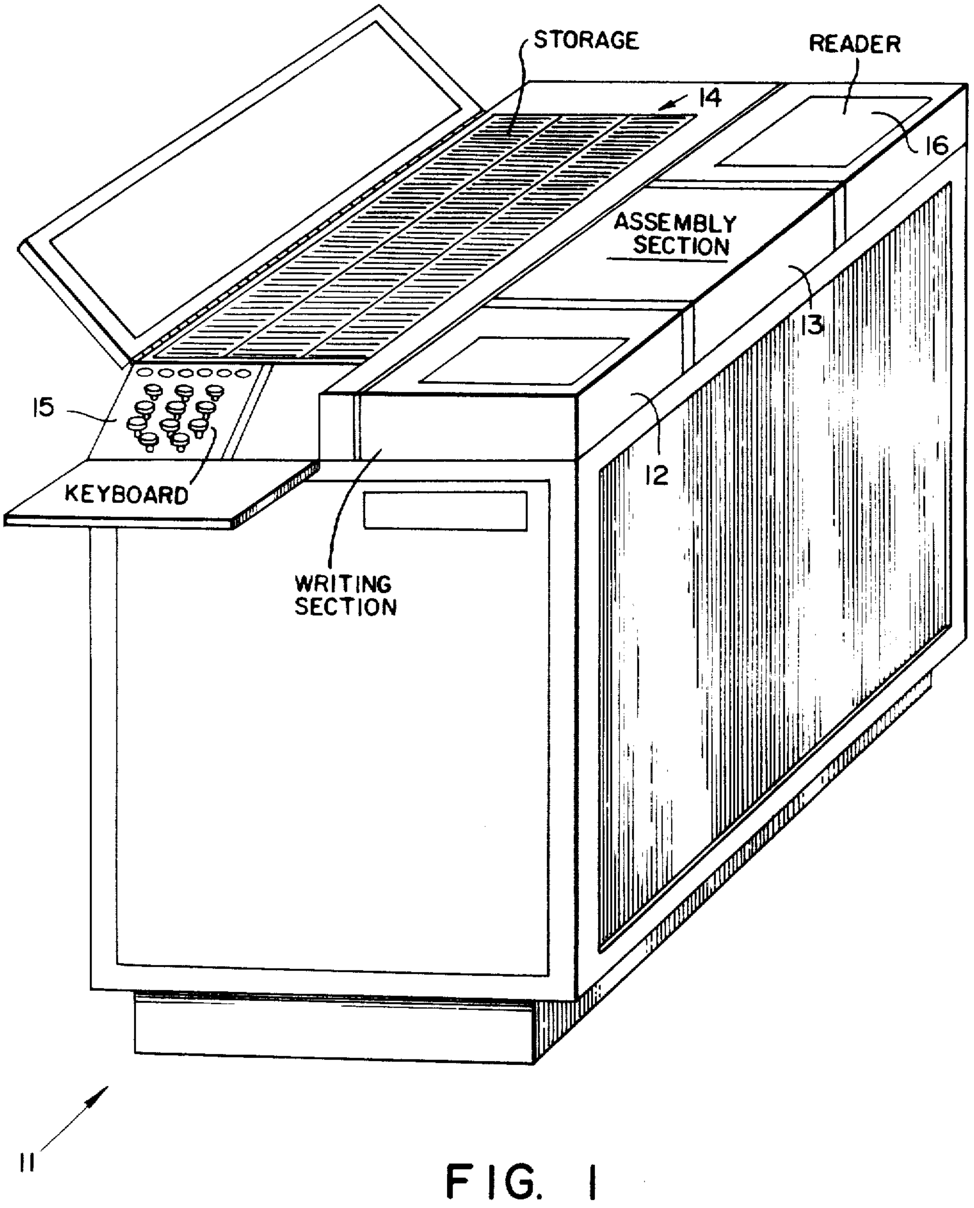
FIG. 1 is a perspective view of a photographic memory system console according to the invention.

With reference now to the drawing and more particularly FIG. 1 thereof, there is shown a perspective view of a photographic information storage system according to the invention. The console 11 may include a writing section 12 for photographing documentary information on microfilm frames, a developing and assembly section 13 for providing film cards or microfiche that may be located in storage area 14 notched and coded through known techniques to characterize the card and identify its address in the storage. A keyboard 15 allows a user to designate a particular card for reading by reader 16 to thereby recover the information in visible or other useful form.

Figure 2:
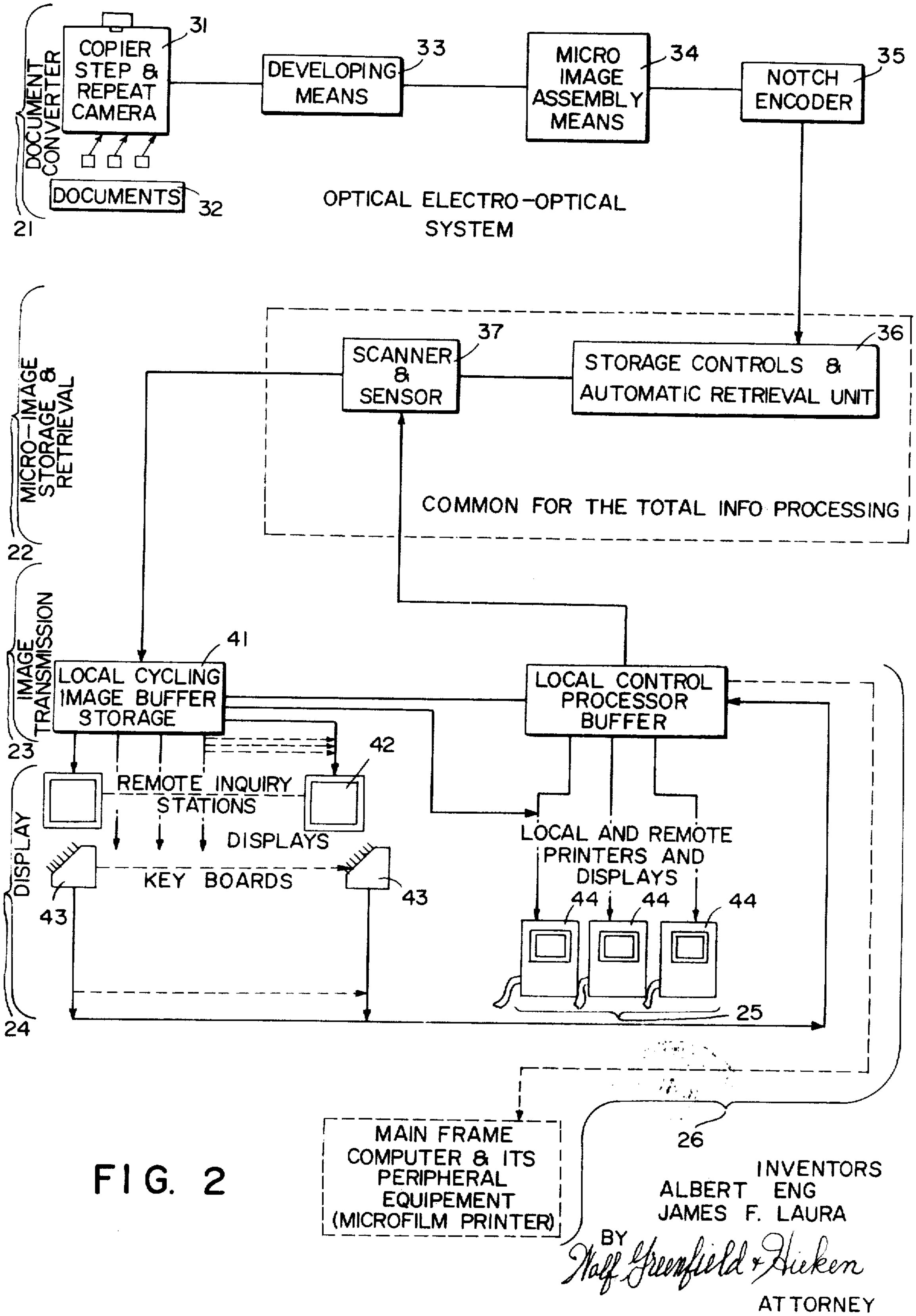
FIG. 2 is a block diagram illustrating the logical arrangement of a system according to the invention.

Referring to FIG. 2, there is shown a block diagram illustrating the logical arrangement of a typical system according to the invention which may be conveniently divided into a document converter subsystem 21, a microimage storage and retrieval subsystem 22, an image transmission system 23, an image display system 24, a hard copy reproduction system 25 and a computer microfilming and flowback printing subsystem 26.

Document conversion subsystem 21 functions to convert existing files of records in pictorial and/or textual form into microimage form. The converted microimages are typically in film form in the shape of cards approximately 4 inches × 6 inches that contain upwards from 70 or more documents of pages of documents. To this end a copier step and repeat camera 31 photographs the documents 32. The exposed microfilm frames are developed by developing means 33 to provide microimages that are assembled by microimage assembling means 34 into microfiche cards that are then encoded by notch encoder 35 and placed in the storage portion of storage, controls and automatic retrieval unit 36, the latter unit typically of the type described in U. S. Pat. No. 3,220,417.

The latter unit is an element of the microimage storage and retrieval subsystem 22. This subsystem 22 stores the image cards and has a retrieval mechanism for transporting the cards to scanner and sensor 37 to provide after scanning a recovered image signal for transfer to auxiliary memory before transmission to display and/or printing stations. Typically scanner 27 may be a flying spot scanner that provides an electrical signal representative of the information scanned.

The image transmission and display subsystem 23 comprises a local cycling image buffer storage means 41 that receives a video signal from scanner and sensor 37 and recycles the stored signal for as long as desired. The storage means may be an image storage tube, a magnetic drum, magnetic discs, magnetic tape, shift register storage, or other suitable storage means. The local cycling image buffer storage means 41 may include a number of storage means to facilitate storing a number of different items in temporary storage for simultaneous access by a number of subscribers, or enable a single subscriber to examine in unusually rapid sequence or simultaneously a number of like items. The advantages of this buffering arrangement is that a single scanner and sensor 37 may scan a card only once in a single cycle and be immediately free to receive the next inquiry about another card, and scan that another card to provide another scanned document signal for storage in another storage unit of local cycling image buffer storage means 41.

Display subsystem 24 typically includes a television monitor 42 at each inquiry station that usually also has an associated keyboard 43 for selecting desired information and releasing the desired information when the subscriber is completed with his examination.

Hard copy reproductions subsystem 25 includes printers 44, which may be electrostatic or film copy printers having a display tube, and an optical system for focusing the image received on the display tube upon the film or paper.

The central processor subsystem 26 basically comprises a computer for processing inquiries, retrieving a particular file, controlling the operation of the subsystems and automatically operating the various units.

Figure 3A:
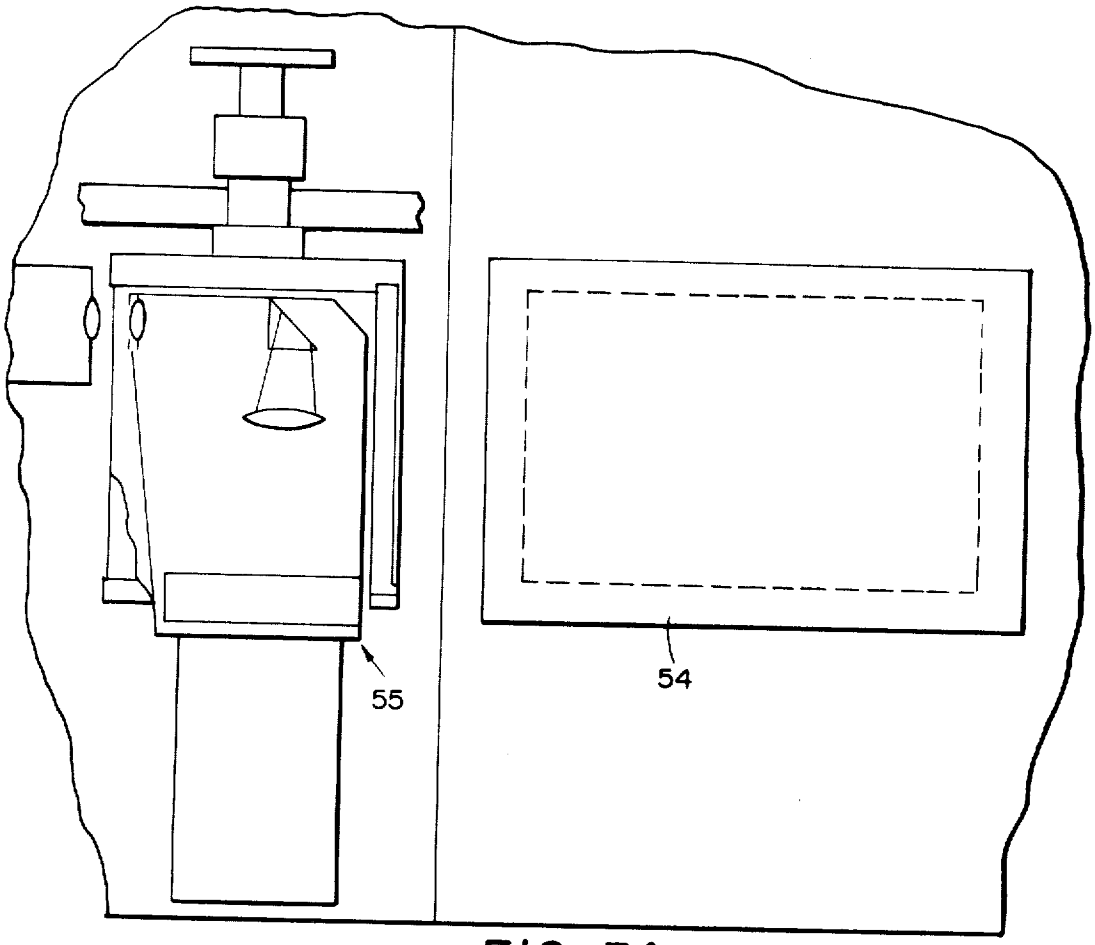
FIG. 3A is a plan view and FIG. 3B an elevation view, partially in section, of elements in a photographic memory system according to the invention.
Figure 3B:
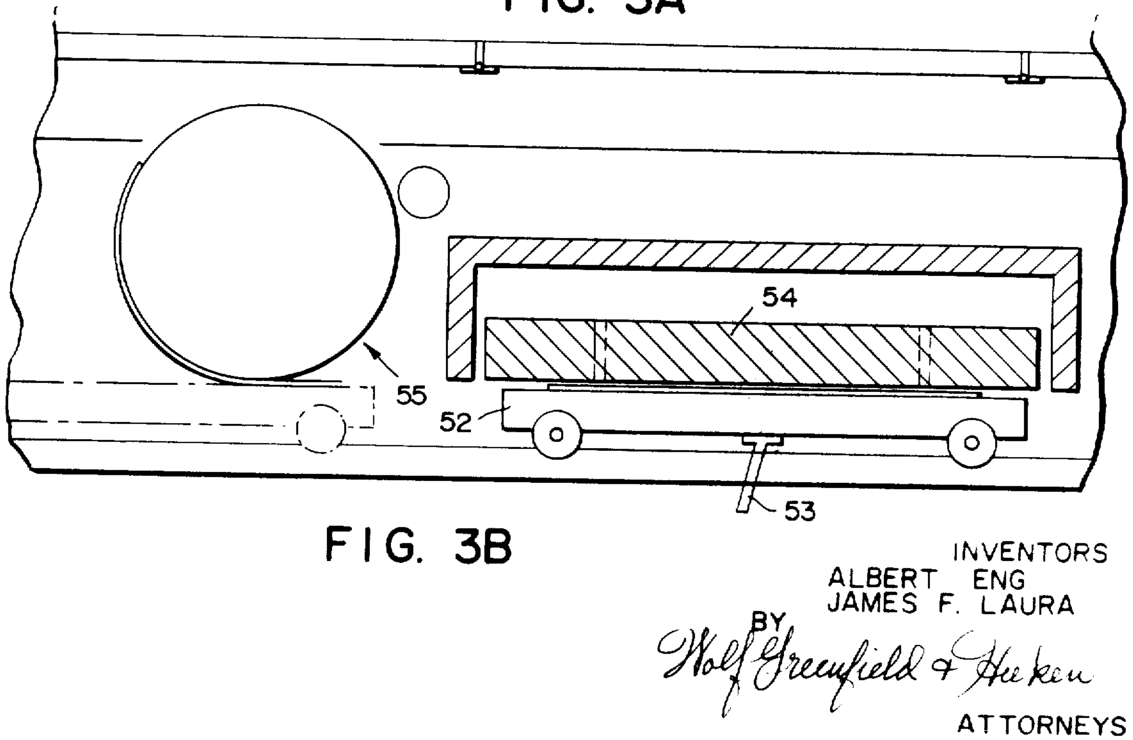

Referring to FIGS. 3A and 3B, there is shown a photographic memory capable of handling information in all the forms previously described but especially useful in connection with handling data in digital form, especially useful with a digital computer system. Such a system may supplement or replace current magnetic tape storage systems to provide a data processing installation with permanently stored digital data having archival properties together with approximately 150:1 volumetric reduction in storage. The data may be stored on microfilm frames, or microfiche card being capable of storing 30,000,000 to 60,000,000 bits of information, the number of bits typically stored in a single reel of magnetic tape.

Access to the film cards may be controlled from the main frame computer for automatic loading or from a keyboard for manual loading. The selected card is automatically or manually attached to a carried 52 and held in place by clips or through vacuum means, including vacuum line 53. If writing is to be performed, the card is first fixed by fixer chamber 54 and then transported across writing station 55. The optical system for writing typically comprises a plurality of individually controllable light spot sources in a column, there being as many individual light sources as there are digit places in a binary word to be recorded. Thus, $n$ individually controllable light sources would be typically employed for recording $n$-bit words. The intensification of the different lights may be controlled in accordance with punch cards or magnetic tape being read to store in optical form the data derived from the card or tape. The writing mechanism may be adjusted for translation orthogonal to the translation of the card being written upon so as to store a number of digital words in a column on a card. The card may then be advance to allow writing the next row of digital data until the entire card is inscribed with digital data.

Data may be recovered by focusing that portion of a column containing a digital word upon a set of photo sensors which provide corresponding levels that represent the data recorded on the card and that may be utilized by a computer or other digital apparatus, or digital-to-analog coverters to form visual images and/or audio signals.

Analog data could also be recorded through various techniques, for example, by deflecting the light beam position from a predetermined reference position representative of an analog value to be recorded. The actual writing could be accomplished by an electron beam whose vertical position along a moving film strip is representative of the voltage applied across deflection plates through which the electron beam passes.

Figure 4:
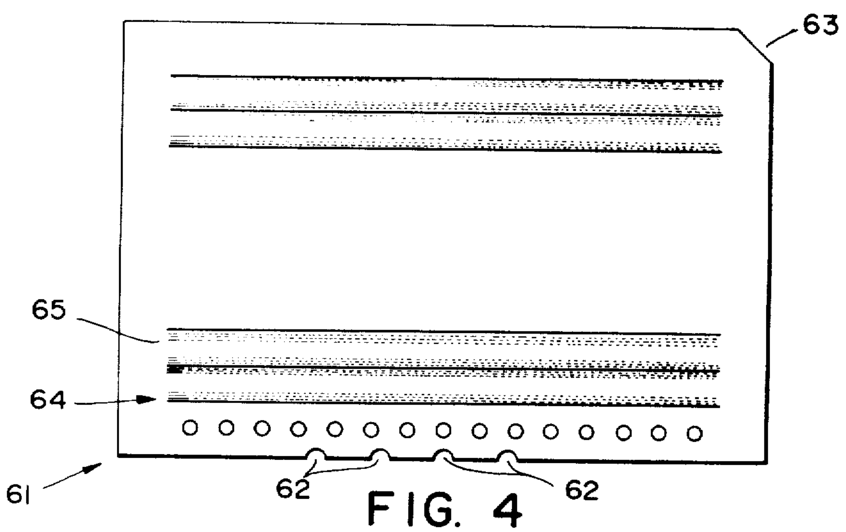
FIG. 4 is a view of a data card embodying the principles of the invention.

Referring to FIG. 4, there is shown a view of a data card embodying the principles of the invention. The card 61 is shown with a number of notches such as 62 at the bottom comprising a notched code to facilitate retrieving the data cell card. A notched corner 63 facilitates identifying the upper right hand corner of the card when properly placed in a carrier. The card may include one or more timing tracks, such as 64 for identifying the location of data cells and many rows of information bits.

Figure 5:
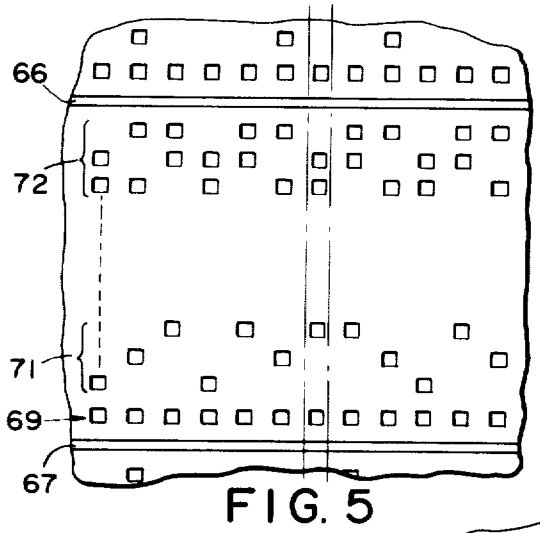
FIG. 5 is an enlarged view of a portion of the data card of FIG. 4.
Figure 9:
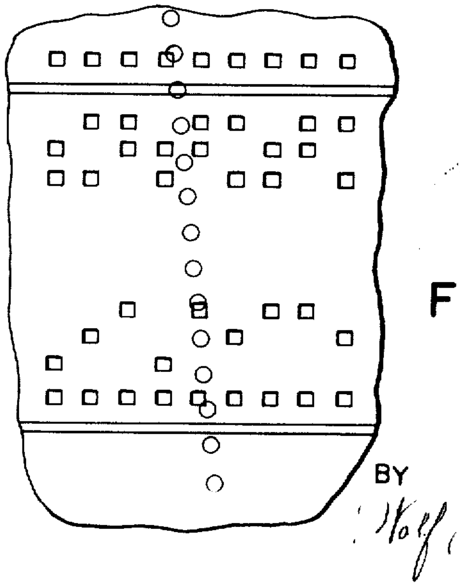
FIG. 9 shows a skewed relationship between a readout head and columns on a data card that still results in accurate readout according to the principles of the invention.

Referring to FIG. 5, there is shown an enlarged view of portion 65 of FIG. 4. A binary word, or BYTE, comprises a number of binary bits in vertical sequence between BYTE borders, such as 66 and 67. It is convenient to represent the two binary digits by the presence and absence, respectively, of a mark in a given physical location. The lowermost row between BYTE borders, such as 64, functions to provide timing marks and carries a mark in each column. The next three rows 71 are so arranged that the three-binary number in each column is the complement of the three-bit binary number in that column in the upper three rows 72. This arrangement of storing information is advantageous because it facilitates identifying the bits composing one BYTE while rejecting bits from adjacent BYTES. The specific code used may be any well known code, such as Gray code, multi-error detection and correction code and excess three coding, or any other code. This arrangement of BYTES between three end rows facilitates determining BYTE row horizontal skew as well as the limits of the BYTE by having upper and lower limit identification BYTE bits, as the card is scanned by a column of sensors. Thus, the readout head may be skewed with respect to a column as in FIG. 9 and read some bits earlier than others within a BYTE without erroneous interpretation because sensing the first three-bit binary number signifies the beginning of a BYTE while sensing the complementary three-bit binary number signifies the end. Slight misalignment might also lead to reading parts of two BYTES simultaneously by one column of sensing elements. However, with the embracing rows 71 and 72 and the row 61 of timing marks, readout circuitry can discriminate between bits from two adjacent BYTES.

Figure 6:
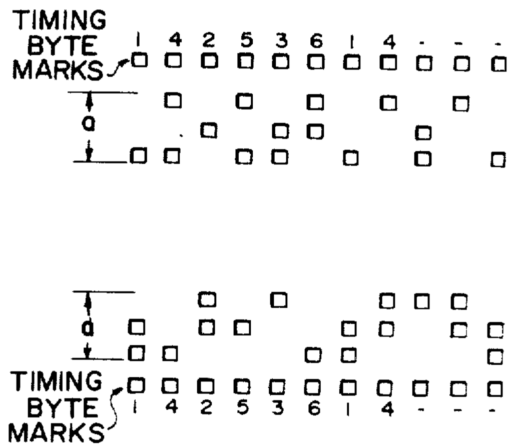
FIG. 6 illustrates a preferred form of logical arrangement for a BYTE on a data card.

A preferred form of logical arrangement for a BYTE therefore includes three binary coded bits at the upper and lower extremes binarily encoding 0-5 so that each adjacent BYTE identifying number is separated by three digits cyclically with the difference between cyclical sets being five digits as best seen in FIG. 6.

Figure 8:
FIG. 8 shows an alternate form of readout head having a number of sensors for each bit in a row suitable for use in a pattern recognition decoding process.
Figure 7:
FIG. 7 shows a one-detector-per-bit readout head for scanning a data card.

Once complementary three-digit binary numbers are recognized to identify a BYTE, the information bit field may be decoded by a standard one-detector-per-bit readout head as indicated in FIG. 7 or by a pattern recognition process represented in FIG. 8 where there are a number of sensors for each bit in a row. For example, one bit may fall on three sensors. Such an arrangement minimizes the need for horizontal alignment of the sensors because the decoding may occur in a predetermined manner based on the particular patter of a BYTE within the three-digit binary end numbers and the timing marks. Once a BYTE is recognized by the extremities of the three-digit numbers, the bit positions in the information field are established; that is, every third sensing element position is a bit or bit spaced position from the two timing marks. Once this is determined, pattern recognition decoding of the BYTE may be initiated. This process will recognize stored data in a manner similar to the one-bit, one-sensor detector, and error detection and error correction, if needed, may be conventionally applied to read the BYTE. This specific arrangement of coding is by way of example only for illustrating the best mode now contemplated for practicing the invention as a reliable and practical means for recording and reading high density digital data.

There are numerous means available for establishing a bit pattern according to the invention. For example, it is possible to use a continuous light source, such as a CW laser, with a solid state light modulator or shutter, such as a Pockel cell, that controls the transmission of light to the recording medium in accordance with the information to be recorded.

Figure 10:
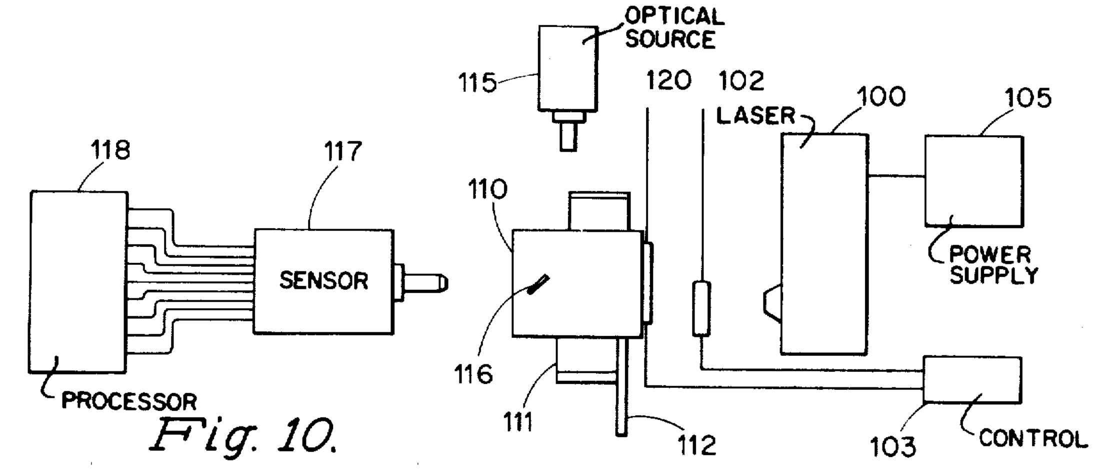
FIG. 10 illustrates an embodiment of a reader-writer according to the invention with a rotatable scanning drum.

Referring now to FIG. 10, there is shown an embodiment of a reader-writer subsystem. The subsystem utilizes a rotatable drum 110, which is preferably adapted for axial movement relative to shaft 111. Rotatable drum 110 is optically transparent over at least a portion of its surface. A data card including film 120 is automatically or manually attached to drum 110 over the optically transparent portion and held in place by clips or through vacuum means, as for example vacuum line 112. In this embodiment, the optical system for writing, includes a laser light source, as for example a continuously pumped neodymium doped YAG laser capable of vaporizing a portion of film 120 for writing individual bits thereon. By way of example, an individual bit may comprise a 10-micron diameter hole in the film 120. Power supply 105 may supply the input signal for the laser 100, which, for selective writing of individual bits, emits a beam impinging upon solid state modulator 102. Solid state modulator 102 controls the transmission of light to the film 120 in accordance with a signal received from control means 103. Preferably, solid state modulator 102 may comprise individual cells for writing individual bits, the combination making up a complete word or BYTE. As the drum rotates, bits are written on film 120 by laser 100 and may be read, as for example 180° later, by a reader portion, which comprises optical source 115, reflecting mirror 116, and optical sensor 117. Preferably, mirror 116 is stationary within rotatable drum 110. Optical source 115, as for example a PEK high intensity lamp, may also include a heat absorbing glass to prevent damage to film 120. Optical sensor 117 may include an array of sensors, as for example an optical fiber-detector array for sensing the individual bits of a BYTE. The respective signals from the optical sensor 117 may then provide the input for processor 118 which couples to the remainder of the system. Preferably, the control means 103 couples to drum 110 for regulating the axial movement thereof. A step motor may be used in conjunction with the control means 103 for providing axial movement of the drum 110 for writing individual BYTES.

Figure 11:
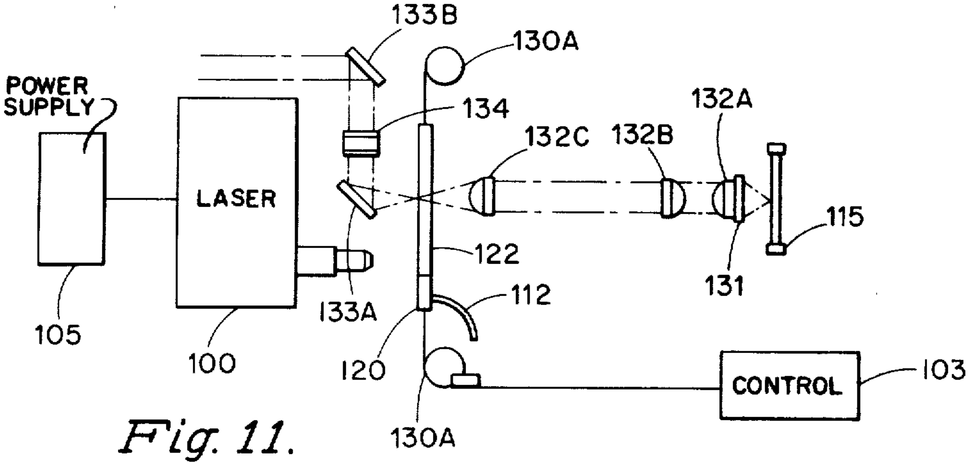
FIG. 11 shows another embodiment of a reader-writer in which a data card is inserted into a shuttle mechanism to traverse the reading and writing fields.

Referring now to FIG. 11, there is shown another embodiment of a reader-writer subsystem in which a data card including film 120 is supported on the face thereof by support means 122. Preferably, support means 122, as for example a glass or plexiglas support, is situated at the face of film 120 remote from optical writing source 100. Again, optical writing source 100 preferably includes a continuously pumped neodymium doped YAG laser, which may be provided with a power supply 105. Film 120 may be held to support means 122 by suitable means, as for example vacuum line 112. The film 120-support means 122 combination is adapted to traverse the beam of laser writer 100 for writing on the complete face of the film 120. To this end, shuttle means 130A and 130B provide vertical movement traversing the beam of writing source 100, while suitable means, such as a stepping motor, establish movement of the film 120-support means 122 combination in a direction orthogonal to the shuttle movement. Thereby film 120 is adapted for complete planar movement. Both shuttle means 130A and 130B and the stepping motor may be controlled by the control means 103 for selectively choosing the location of the individual bits and BYTES written by optical writer 100.

The reader system again comprises a light source 115, as for example high intensity arc lamp, and further includes a collecting lens system comprised of: heat absorbing glass 131 (to prevent damage to the film 120 by the high intensity light), the condensing lens combination of 132A, 132B, and 132C, front surface flat mirror reflectors 133A and 133B, and condensing lens 134. The light collecting system focuses the light on the surface of film 120. The light may be collected by suitable collecting and sensing devices at a point remote from mirror 133B.

Figure 12:
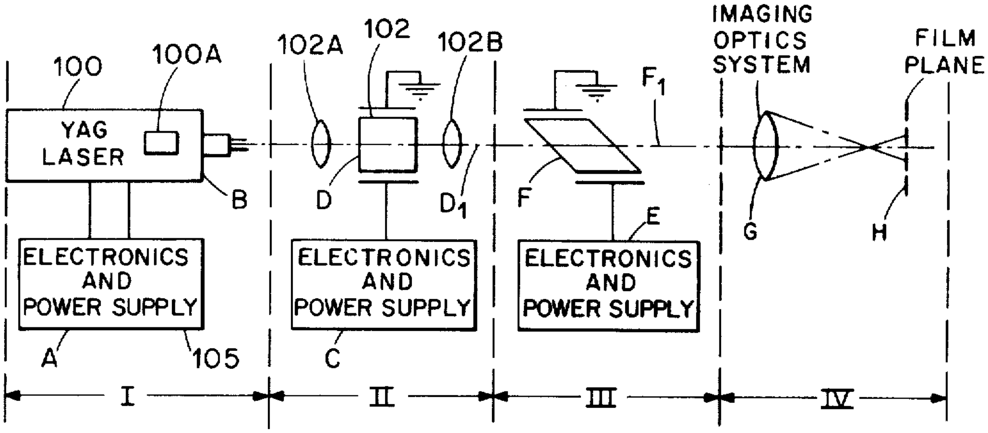
FIG. 12 illustrates an embodiment of a laser writer according to the invention.

Referring now to FIG. 12, there is illustrated a laser writer subsystem in which laser source 100 includes a polarizer 100A. Laser source 100 preferably may yield a signal of approximately 2 mm. in diameter with a power of 8 to 10 watts C.W. Modulator 102 is positioned to receive the polarized laser signal and is provided with a power supply 106. Preferably, modulator 102, which may include lenses 102A and 102B, yields a pulsed coherent light beam at a rate greater than 1 MHz.

In order to understand the operation of the writing system, the criteria for writing on films by optical means may be considered. In general, the energy intensity required to vaporize thin films (a few microns thickness) of totally absorbent dielectric materials may be approximately 10.2 joules per square centimeter, thereby requiring approximately 10.2 microjoules for a 10 micron hole. Where there is metallic surface film of several micron thickness, the requirement may be as high as 10 joules per square centimeter, resulting in an energy of 10 microjoules for a 10 micron hole.

In order to minimize energy losses resulting from thermal conduction from the irradiated zone, it may be necessary to apply the energy in a time period on the order of a thermal time constant of the material. For dielectric material, this time constant may be on the order of several microseconds; for metallic surfaces, on the order of tenths of a microsecond. In either case, the use of a switched laser pulse with durations of one microsecond can provide efficient utilization of the energy for the vaporization process.

In order to achieve the required repetition rates, a continuously pumped neodymium doped YAG laser may be utilized, thus providing the necessary average and peak powers and the focusing capability for the required spot diameter. Where 10 micron diameter holes are desired to be vaporized on the film, a maximum average power of 0.1 watts is needed at a 10KHz repetition rate. To provide for the 10KHz repetition rate, a switch may be provided, as for example a Q-switch. This intracavity type device usually comprises a quartz crystal with a piezoelectric transducer and driver electronics. In the switch-off position an acoustic wave of about 50 MHz is propagated through the crystal transverse to the optical beam. The acoustic wave serves to diffract a portion of the optical beam resulting in a loss which prohibits the laser from oscillating. As a result, pump energy may be stored in the excited neodymium ions for the first 100 microseconds (the lifetime of the excited state) of each switch-off interval.

In the switch-on position, the 50 MHz acoustic wave is turned off, resulting in a very low loss in the optical resonator. The resonator loop gain will exceed unity and the optical field will grow rapidly while depleting the excited state population. The resulting pulse of a duration of about 0.1 microseconds has an energy of 0.3 millijoules. The switch may be activated on command by electrical signal automatically or in chosen repetition rate up to 10 KHz.

In order to regulate the diameter of the holes, the laser beam must not diverge inordinately. The beam divergence, defined as the total angle containing 90 percent of the radiated energy, preferably is less than 6 mr with an average power of over 0.1 watts from the center 1.0 mr radiating from a region of less than 1 millimeter. Thus, the *f*-number of the optical system to produce 10 micron holes is *f*/10. It is easily seen that the optics required for this must operate over a narrow field of view and over a selectively frequency band.

To selectively generate 10 micron holes in rows of 10 holes, the laser may be operated at a 100 KHz rate and sequentially scan over micron spots at a rate of 10 KHz. It is preferable to store the energy during an interpulse period in the optical field rather than in the laser medium, and then deliver this stored energy at the required rate. This may be done by providing a mode-locked laser with total reflectors on both ends of the laser resonator, thus trapping the energy in the resonator, and periodically shunting the reciprocating pulse out of the resonator on command.

Beam deflection may be accomplished with an intracavity acoustic-optic deflector similar to the above Q-switch. The deflector may be employed simultaneously as a pulse damper. A mode locking modulator, operated at one-half the resonator free spectral range, may serve to phase lock the modes of the resonator providing a short high intensity pulse travelling back and forth within the resonator. A typical round trip time may be 10 nanoseconds. On command, the deflector activates with a high frequency acoustical wave deflecting a portion of the optical wave out of the resonator in the specific direction desired. The deflector may provide over 1 percent loss per pass; therefore, in 100 passes (less than 1.0 microsecond), all of the energy may be deflected upon the film. The deflector may then be turned off for 9 microseconds, allowing the pulse to again build up in the resonator. On command, the deflector is then reactivated, deflecting the pulse to a second spot on the film. In this manner, separate pulses may be produced at a rate of 100 KHz. Each pulse may be individually controllable by the deflector. The parameters may be such that extensions to the rate of 1 MHz are feasible.

There has been described a novel information storage and retrieval system characterized by a relatively small volume accommodating an enormous amount of information to which rapid access is easily obtainable. It is evident that those skilled in the art may now make numerous uses and modifications of and departures from the specific embodiments described herein. Consequently, the invention is to be construed as embracing each and every novel feature and novel combination of features present in or possessed by the apparatus and techniques herein disclosed and limited solely by the spirit and scope of the appended claims.

What is claimed is:

1. Information storage and retrieval apparatus comprising

A. main storage means having documents stored therein, each stored document being characterized by a document address, B. means for retrieving a stored document from the main storage means in response to input signals identifying the document address, C. means for optically scanning the retrieved document to obtain informational signals representing information carried by the document, D. buffer storage means for storing the informational signals and selectively releasing the informational signals in response to a command signal, the buffer storage means being capable of simultaneously retaining information obtained from a plurality of documents, E. and output means for receiving the released informational signals, the output means including a device for providing a visual display of information stored on a document.

2. The method of storing and retrieving information in a system where information is recorded on documents in the form of optically transparent and opaque bits and the documents are stored in a main store, the steps of A. providing a beam of coherent light B. placing a document on a carriage and moving the carriage transversely to the beam, C. deflecting the beam to different positions on the document, D. optically writing transparent bits on the document, E. storing the document in the main store, F. retrieving a stored document from the main store in response to input signals identifying the document address, G. optically scanning the retrieved document to obtain informational signals representing information recorded on the document, H. storing the informational signals in a buffer storage means, the buffer storage means being capable of simultaneously retaining informational signals obtained from a plurality of documents, I. releasing selected informational signals from the buffer storage means in response to a command signal, J. utilizing the released informational signals to provide a visual display of information recorded on the document.

* * * * *